J. E. ERICKSON.
DEVICE FOR USE IN CHANGING TIRES.
APPLICATION FILED APR. 2, 1918.
1,339,504.
Patented May 11, 1920.
3 SHEETS—SHEET 1.
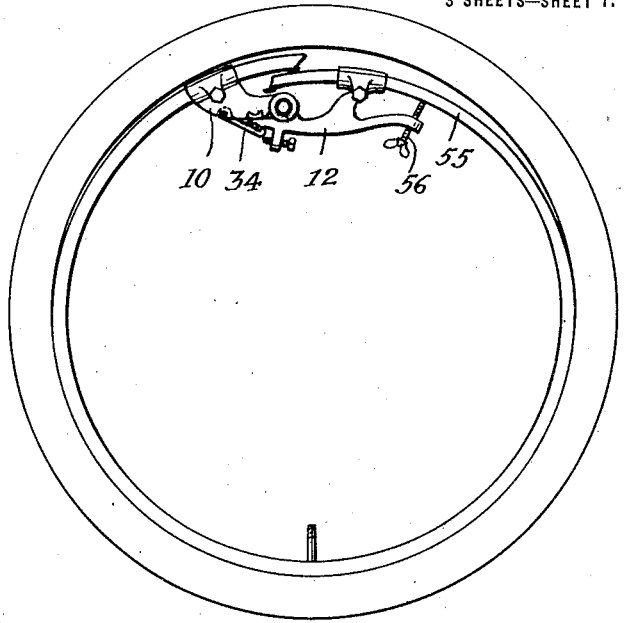
Fig. 1.
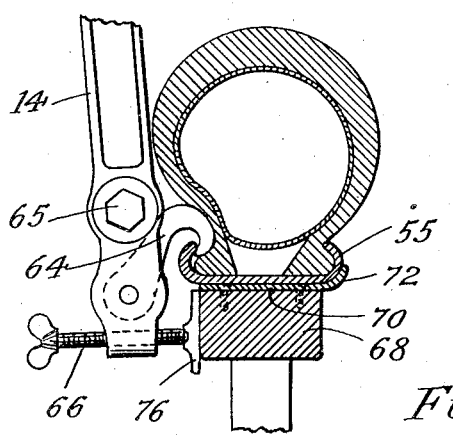
Fig. 9.
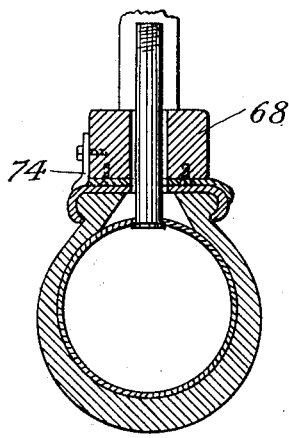
Inventor:
John E. Erickson
By Whiteley and Ruckman
his Attorneys.

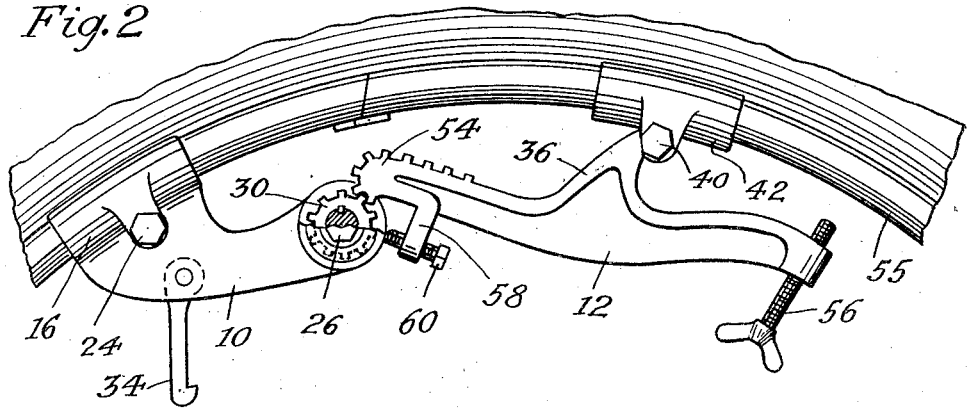
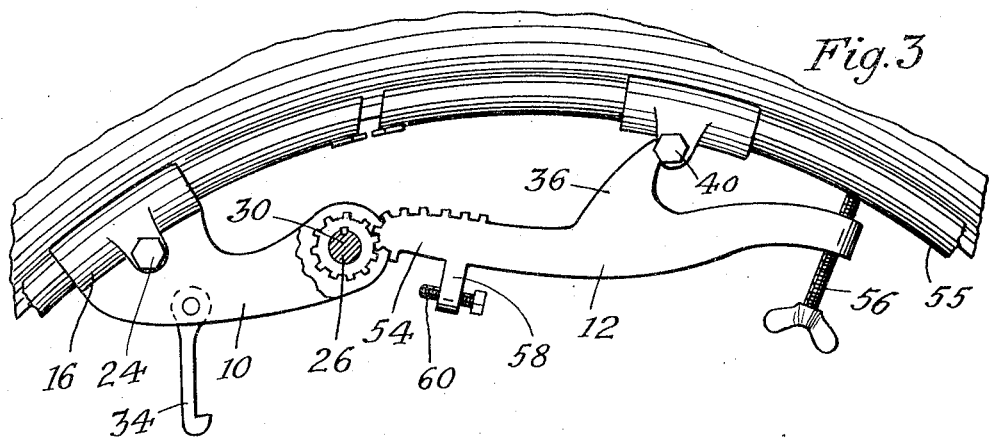
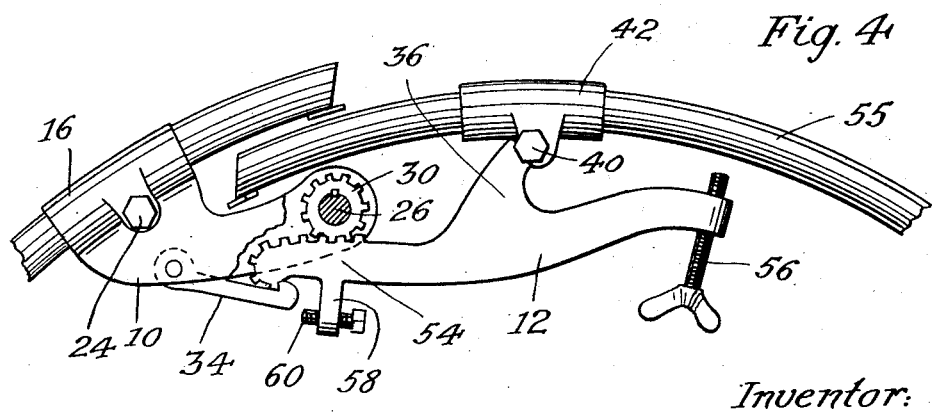

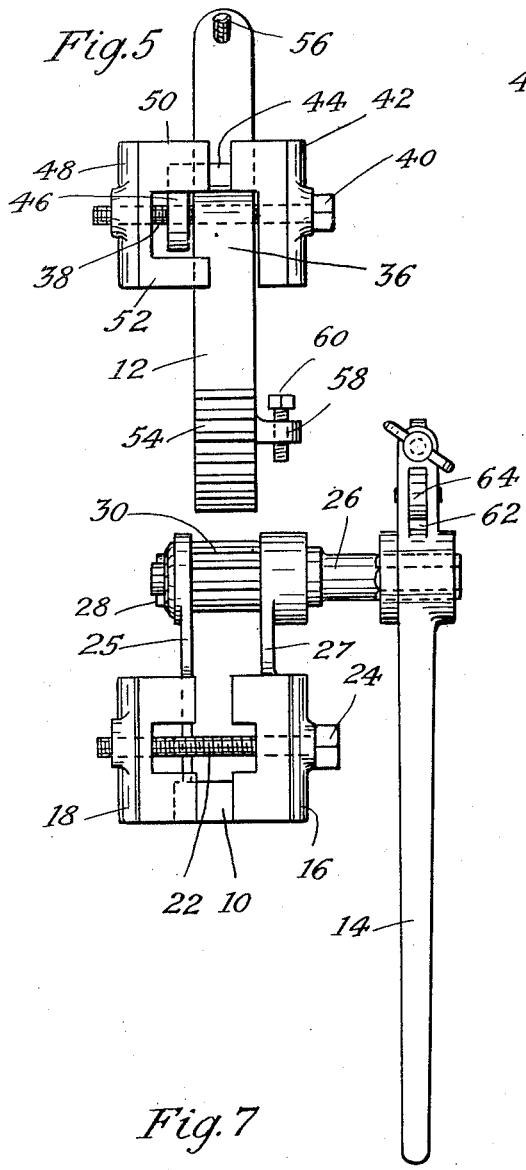
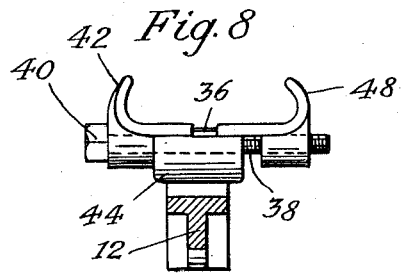
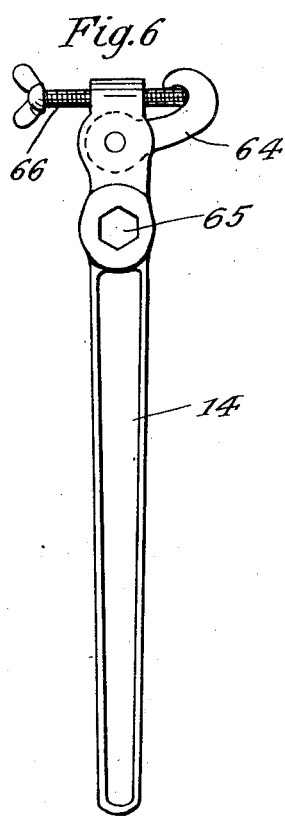
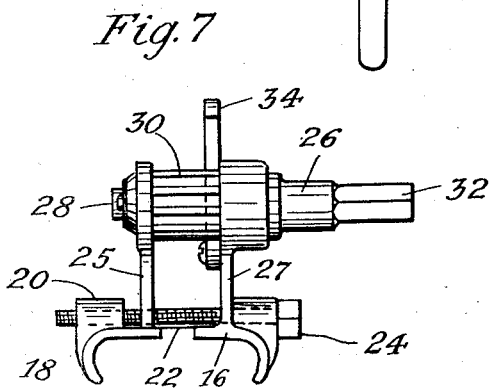

ial portion of the shaft is provided with an angular portion 32 for receiving the handle. Pivoted to one of the arms of the casting is a locking dog 34 for a purpose which will presently appear.

UNITED STATES PATENT OFFICE.

JOHN E. ERICKSON, OF ST. PAUL, MINNESOTA.

DEVICE FOR USE IN CHANGING TIRES.

1,339,504.  Specification of Letters Patent.  Patented May 11, 1920.

Application filed April 2, 1918. Serial No. 226,145.

*To all whom it may concern:*

Be it known that I, JOHN E. ERICKSON, a citizen of the United States, residing at St. Paul, in the county of Ramsey and State of Minnesota, have invented certain new and useful Improvements in Devices for Use in Changing Tires, of which the following is a specification.

My invention relates to devices for use in changing tires and has for its object to provide a device of this kind by which tires such as automobile tires can be quickly removed and replaced by new tires.

The full objects and advantages of my invention will appear in connection with the detailed description thereof and are particularly pointed out in the claims.

Referring to the accompanying drawings, which illustrate the application of my invention in one form,—

Figure 1 is a view in side elevation showing the device applied to the removable metal rim of an automobile wheel. Fig. 2 is an enlarged detail showing the device applied in position before it has been operated. Fig. 3 is a view showing a device partly operated. Fig. 4 is a view showing the device completely operated. Fig. 5 is a plan view of a device looking toward the inside of the clamping jaws and showing the operating handle applied. Fig. 6 is a side view of the operating handle. Fig. 7 is an end view of the pinion member of the device. Fig. 8 is a view in section. Fig. 9 is a view showing the handle member in position to pull the metal rim with its tire from the felly.

My device consists of three essential parts, designated as follows,—the pinion member 10, a rack member 12 and a handle member 14. The pinion member consists of a casting provided with a jaw 16 which is integral therewith. Coöperating with this jaw is an adjustable jaw 18, best shown in Fig. 7, which has a screw-threaded boss 20 thereon adapted to receive the screw-threaded end of a bolt 22 which extends loosely through an opening adjacent the fixed jaw, and which at this end is provided with a head 24 by which it can be turned. The portion of the casting extending beyond the jaws is in the form of two arms 25 and 27, in the ends of which is rotatably mounted a shaft 26 which extends through openings provided for this purpose in the casting and which is held in place by a cotter pin 28. On the shaft, lying between the two arms, is a pinion 30, while the outer end of the shaft is provided with an angular portion 32 for receiving the handle. Pivoted to one of the arms of the casting is a locking dog 34 for a purpose which will presently appear.

The rack member 12 comprises a single arm extending from which is a boss 36 through an opening in which a bolt 38 loosely extends, the bolt being provided with a head 40. Between this head and the boss is a jaw 42 having a hollow partially cylindrical extension 44, the end of which is laterally extended at the other side of the boss, as shown in Fig. 5, to constitute a portion 46 provided with an opening in line with an opening in the jaw portion. The bolt 38 extends loosely through the openings in the jaw portion, the boss 36 and the portion 46, and hence the jaw 42 is in this manner rockably held on the boss 36. Adapted to coöperate with the jaw 42 is a slidable jaw 48 having a screw-threaded opening to receive the screw-threaded end of the bolt 38. The jaw 48 has two inwardly-projecting lugs, one of which, 50, is adapted to slide over the portion 44 of the other jaw, and the other one of which, 52, is adapted to engage the boss 36 and limit the amount of rocking movement of the two jaws. One end of the casting is provided with a rack member 54 extending along one side thereof and around the end.

The manner in which my device is used will now be obvious from an inspection of Figs. 2, 3 and 4, which show successive positions during the operation. The customary split metal tire carrying rim 55 is first removed from the felly either by hand or by means of the device to be described later, and the device already described is applied to the tire rim as shown in Fig. 2 with the jaw members located on opposite sides of the split and the end portion of the rack in engagement with the pinion. The handle member 14 is applied to the shaft 26 and turned in a clockwise direction, the first effect of which is to open up the split and lift the left-hand portion of the rim as viewed in Fig. 3, above the right-hand portion. By continued turning movement of the pinion, the two portions of the rim adjacent the split move past each other as shown in Fig. 4, thereby decreasing the diameter of the rim as shown in Fig. 1, thus allowing the old tire to be readily removed and a new one placed in position.

While this latter operation is being performed the rim is locked in the position of Fig. 4 by engaging the dog 34 with the end of the rack 54. When a new tire has been applied the dog is disengaged from its locking position and the direction of movement of the handle is reversed, thereby restoring the parts to their original position as shown in Fig. 2. The rear end of the casting 12 is provided with a screw bolt 56 which may be adjusted in accordance with the size of the wheel and therefore constitutes an adjustable abutment. To allow the end of this bolt to engage the rim in various positions of adjustment the casting 12 and the jaws thereon are rockably connected, as previously described. Projecting from the end of the casting near the rack 54 is a lug 58 fitted with a screw bolt 60 which serves as an adjustable stop to engage the end of the casting 10 to determine the position of the pinion 30 upon the rack 54 at the beginning of the operation as shown in Fig. 2.

The handle member 14 at its end near the opening 65 is provided with a slot 62 in which is pivoted a hook 64, and beyond this at the extreme end is a screw-threaded opening provided with a screw bolt 66. This device is used for pulling the metal rim and tire carried thereby from the felly 68 in the manner shown in Fig. 9. This device is useful, particularly when the wheel has become coated with mud which might render the removal of the rim by hand difficult. Referring to the wheel as shown in this figure, the felly has secured to it a metal rim 70 curved outward on one side at 72. The tire carrying rim 55 is held in place around this ring by a number of clips 74 detachably secured to the felly. These clips, with the exception of the one adjacent the inflating valve, are removed and the device applied as shown in Fig. 9 at a point remote from the valve, with the hook 64 extending over the curved edge of the rim 55 and with the bolt 66 bearing upon the felly, or, if desired, upon a metal plate 76 which may be placed against the felly to prevent marring the same. Upon applying force to the handle 14 in the direction of the arrow, the metal rim may be readily pulled off the felly. When this has been done, the tire may be removed from the rim and replaced by a new tire in the manner previously described.

The advantages of my invention will be obvious from the foregoing description. The device can be used either in the garage for changing tires or it can be carried along in the automobile and used on the road for this purpose.

I claim:

1. A device for use in changing tires comprising two members, jaws on each of said members for securing one of them to a tire rim on each side of the split therein, a rack on one of said members extending along the side thereof and around the end, a pinion rotatably mounted in the other of said members adapted to mesh with said rack, and a handle for turning said pinion.

2. A device for use in changing tires comprising two members, adjustable jaws on each of said members for securing one of them to a tire rim on each side of the split therein, means for rockably attaching the jaws on one of said members, an adjustable abutment on said member, a rack on said member extending along the side thereof and around the end, an adjustable stop adjacent said rack, a pinion rotatably mounted in the other of said members adapted to mesh with said rack, a pivoted dog on said member adapted to lock with said rack, and a handle for turning of said pinion.

In testimony whereof I hereunto affix my signature.

JOHN E. ERICKSON.